US012766950B2

(12) United States Patent
Hamanaka et al.

(10) Patent No.: US 12,766,950 B2
(45) Date of Patent: Oct. 20, 2026

(54) DRIVE SYSTEM

(71) Applicant: IJTT Co., Ltd., Ebina (JP)

(72) Inventors: Yoshihisa Hamanaka, Ebina (JP); Sou Kato, Ebina (JP); Tomohiro Ishikawa, Ebina (JP); Hirokazu Takizawa, Ebina (JP)

(73) Assignee: IJTT CO., LTD., Kanagawa (JP)

( * ) Notice: Subject to any disclaimer, the term of this patent is extended or adjusted under 35 U.S.C. 154(b) by 0 days.

(21) Appl. No.: 18/844,236

(22) PCT Filed: Feb. 7, 2023

(86) PCT No.: PCT/JP2023/003989
§ 371 (c)(1),
(2) Date: Mar. 17, 2025

(87) PCT Pub. No.: WO2023/171204
PCT Pub. Date: Sep. 14, 2023

(65) Prior Publication Data

US 2026/0008335 A1 Jan. 8, 2026

(30) Foreign Application Priority Data

Mar. 8, 2022 (JP) ................................ 2022-035292

(51) Int. Cl.
*B60K 17/22* (2006.01)
*F16D 3/22* (2006.01)

(52) U.S. Cl.
CPC ................ *B60K 17/22* (2013.01); *F16D 3/22* (2013.01); *B60Y 2200/91* (2013.01)

(58) Field of Classification Search
CPC ....... B60K 17/22; F16D 3/22; B60Y 2200/90; B60Y 2200/91

(Continued)

(56) References Cited

U.S. PATENT DOCUMENTS 4,881,924 A * 11/1989 Gall .......................... F16D 3/40 464/134
5,469,931 A * 11/1995 Kawata ................. F16C 35/063 464/157

(Continued)

FOREIGN PATENT DOCUMENTS

CN 202100620 U * 1/2012
CN 104088919 A * 10/2014

(Continued)

OTHER PUBLICATIONS

International Search Report mailed May 9, 2023, in connection with corresponding International Application No. PCT/JP2023/003989 (6 pp., including machine-generated English translation).

(Continued)

*Primary Examiner* — Keith J Frisby
(74) *Attorney, Agent, or Firm* — McCormick, Paulding & Huber PLLC

(57) ABSTRACT

A drive system is provided that suppresses vibration and noise. A drive system 1 for an electric vehicle includes a gearbox 3 that outputs a driving force from a motor 2, a final reduction gear 4 for transmitting the input driving force to left and right wheels; and a propeller shaft 5 extending in a front-rear direction and connecting the gearbox and the final reduction gear. The propeller shaft includes an input end part 9 that is coaxially connected to an output shaft 8 of the gearbox, an output end part 10 that is coaxially connected to an input shaft of the final reduction gear; a constant velocity joint 7 that is disposed at an intersection angle θ greater than zero and equal to or less than a predetermined upper limit, and a slide part 11 that allows relative movement of the final reduction gear with respect to the gearbox in the front-rear direction.

5 Claims, 15 Drawing Sheets

(58) Field of Classification Search
USPC .......................................... 180/379, 380, 381
See application file for complete search history.

(56) References Cited

U.S. PATENT DOCUMENTS

| | | | | | |
|---|---|---|---|---|---|
| 5,611,135 | A * | 3/1997 | Breese | F16D 3/40 464/134 |
| 5,716,276 | A * | 2/1998 | Mangas | F16C 3/035 464/134 |
| 5,836,823 | A * | 11/1998 | Shellaberger | F16D 3/387 464/134 |
| 6,193,007 | B1 * | 2/2001 | Lie | B60K 5/02 180/374 |
| 6,367,680 | B1 * | 4/2002 | Duggan | F16D 3/33 29/DIG. 48 |
| 6,484,384 | B1 * | 11/2002 | Gibson | B21D 26/051 29/523 |
| 6,754,943 | B1 * | 6/2004 | Perry | B23P 11/00 29/421.1 |
| 9,347,483 | B2 * | 5/2016 | Ono | F16C 3/02 |
| 2004/0152527 | A1 * | 8/2004 | Fairchild | F16D 3/227 464/143 |
| 2019/0168603 | A1 * | 6/2019 | Nilsson | B60K 17/356 |
| 2021/0188031 | A1 | 6/2021 | Dutkiewicz et al. | |

FOREIGN PATENT DOCUMENTS

| | | | | | |
|---|---|---|---|---|---|
| CN | 105862558 | A * | 8/2016 | E01C 23/065 |
| JP | 2009-214818 | A | 9/2009 | |
| JP | 2019-513619 | A | 5/2019 | |
| JP | 2020090147 | A | 6/2020 | |
| KR | 200396905 | Y1 * | 9/2005 | B60K 17/22 |
| KR | 20080006725 | A * | 1/2008 | B60K 17/22 |
| WO | 2017178595 | A2 | 10/2017 | |
| WO | WO-2020045532 | A1 * | 3/2020 | F16C 27/06 |
| WO | WO-2020170660 | A1 * | 8/2020 | B60K 17/22 |
| WO | WO-2020170661 | A1 * | 8/2020 | F16D 3/06 |
| WO | WO 2021/145100 | A1 * | 7/2021 | |

OTHER PUBLICATIONS

Japanese First Office Action and its English machine translation for corresponding Japanese Patent Application No. 2022-035292 dated Oct. 29, 2024 (12 pp.).

Japanese Second Office Action and its English machine translation for corresponding Japanese Patent Application No. 2022-035292 dated Mar. 18, 2025 (11 pp.).

* cited by examiner

DRIVE SYSTEM

CROSS-REFERENCE TO RELATED APPLICATIONS

This application is a National Stage application of International Patent Application No. PCT/JP2023/003989, filed on Feb. 7, 2023, which claims priority to Japanese Patent Application No. 2022-035292, filed on Mar. 8, 2022, each of which is hereby incorporated by reference in its entirety.

TECHNICAL FIELD

This disclosure relates to a drive system, and in particular to a drive system for transmitting a driving force from a motor to wheels in an electric vehicle.

BACKGROUND

In an electric vehicle, there is a case that the driving force from the motor is transmitted to the left and right wheels through a gearbox, a propeller shaft, and a final reduction gear.

[PTL 1] JP 2019-513619

SUMMARY

In this case, shortening a distance between the gearbox and the final reduction gear and shortening the propeller shaft is advantageous because it allows for a larger space to mount a battery.

However, this increases an intersection angle of the universal joint provided in the propeller shaft, which increases vibration and noise caused by rotational fluctuations. Electric vehicles are vehicles that inherently produce little vibration and noise, so if these become too great, product performance will be significantly reduced.

The present disclosure has been devised in light of these circumstances, and its purpose is to provide a drive system that suppresses vibration and noise.

Solution to Problem

According to one aspect of the present disclosure, a drive system for an electric vehicle is provided, the drive system comprising: a gearbox that outputs a driving force from a motor; a final reduction gear for transmitting the input driving force to left and right wheels; and a propeller shaft extending in a front-rear direction and connecting the gearbox and the final reduction gear, wherein the propeller shaft comprises: an input end part that is coaxially connected to an output shaft of the gearbox; an output end part that is coaxially connected to an input shaft of the final reduction gear; a constant velocity joint that is disposed at an intersection angle greater than zero and equal to or less than a predetermined upper limit; and a slide part that allows relative movement of the final reduction gear with respect to the gearbox in the front-rear direction.

Preferably, the upper limit is 10°.

Preferably, a distance between the gearbox and the final reduction gear in the front-rear direction is 500 mm or less.

Preferably, the gearbox is disposed in a rearward inclined state.

Preferably, the input end part is connected to an output shaft of the gearbox by a spline so as to be axially slidable, and the input end part forms the slide part.

Preferably, the constant velocity joint is a double Cardan joint or a Rzeppa joint.

Preferably, the input end part is fixed to an output shaft of the gearbox by a flange.

Preferably, the input end part is formed by a Cardan joint disposed at an intersection angle equal to zero.

Preferably, the propeller shaft has an input side split shaft part and an output side split shaft part formed by splitting a middle part of the propeller shaft, and the input side split shaft part and the output side split shaft part are connected to each other by a spline so as to be axially slidable to form the slide part.

Preferably, the propeller shaft has another constant velocity joint that can expand and contract in an axial direction, and the another constant velocity joint forms the slide part.

Preferably, the another constant velocity joint is a double offset joint.

According to the present disclosure, it is possible to provide a drive system that suppresses vibration and noise.

DETAILED DESCRIPTION

Embodiments of the present disclosure will be described below with reference to the attached drawings. Please note that the present disclosure is not limited to the following embodiments.

First Embodiment

Figure 1:
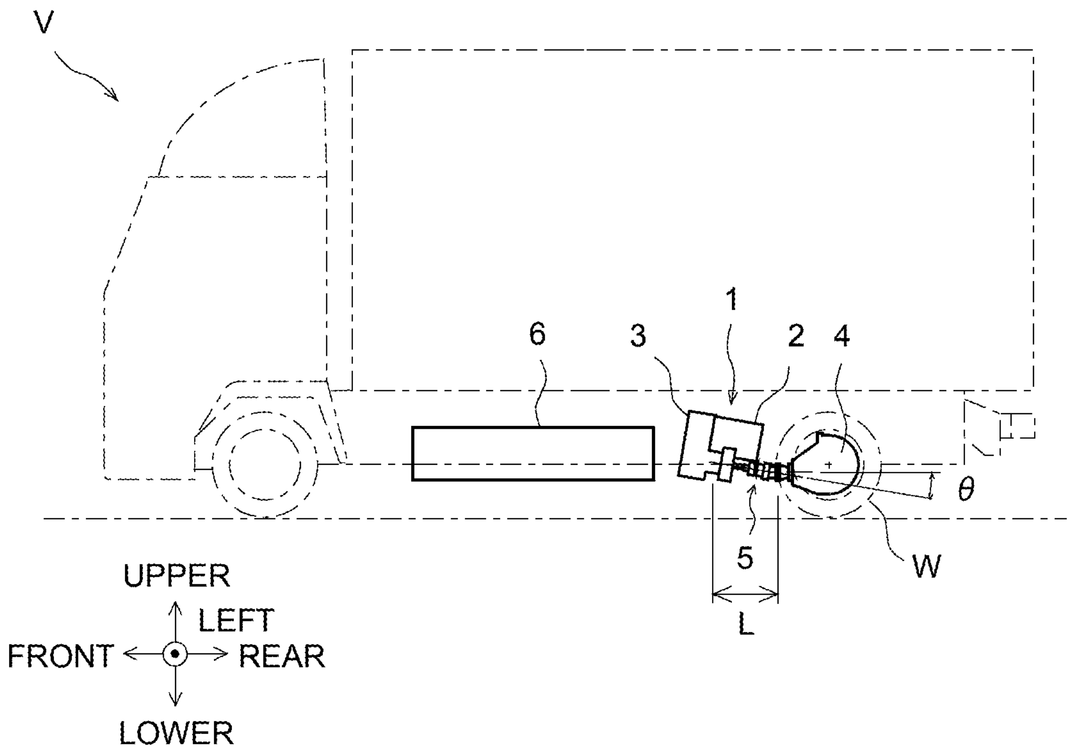
FIG. 1 is a side view showing a vehicle to which a drive system according to a first embodiment is applied.

FIG. 1 shows a vehicle V to which a drive system 1 according to a first embodiment is applied. The vehicle V is an electric vehicle that runs only by the motor 2, and in this embodiment, it is a commercial vehicle, specifically a truck. However, the type of vehicle is arbitrary, and it may be a passenger car, SUV, etc. Front, rear, left, right, upper and lower directions of the vehicle V are shown in the figures.

Figure 2:
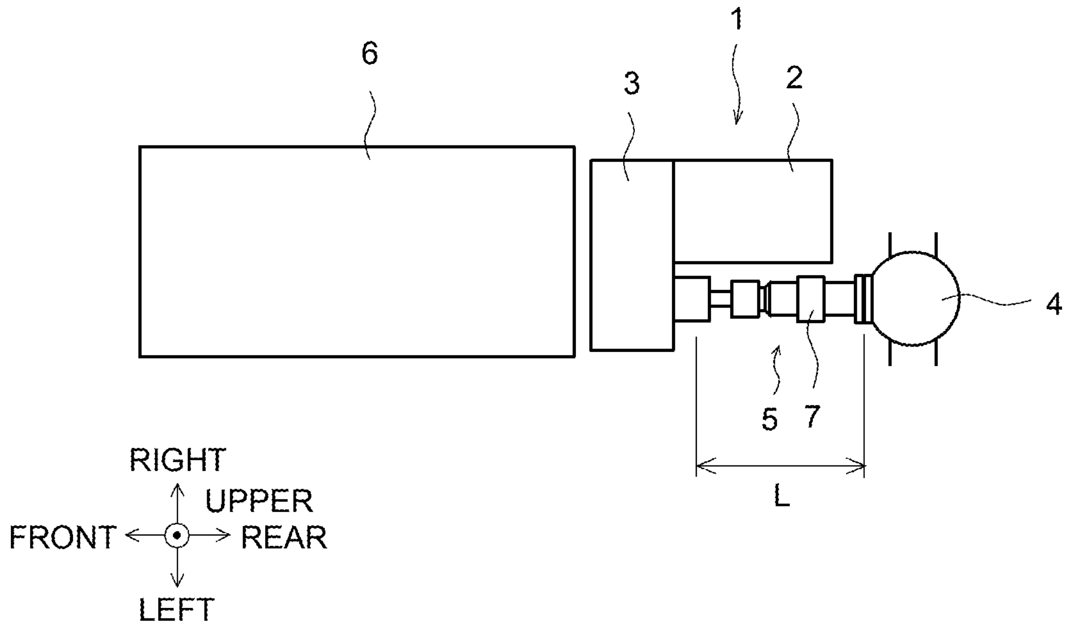
FIG. 2 is a plan view showing the drive system.

As also shown in FIG. 2, the vehicle V comprises an electric motor 2, a gearbox 3 that inputs and outputs a driving force from the motor 2, a final reduction gear 4 for transmitting the input driving force to left and right wheels, i.e., rear wheels W that are driving wheels, and a propeller shaft 5 that extends in a front-rear direction and connects the gearbox 3 and the final reduction gear 4. The gearbox 3, the final reduction gear 4, and the propeller shaft 5 form the drive system 1. A battery 6 is arranged in front of and in proximity to the drive system 1. As is well known, the final reduction gear 4 includes a differential gear that distributes the driving force to the left and right rear wheels W.

The gearbox 3 is arranged in front of and above (upper front of) the final reduction gear 4 in a rearward inclined state, with a predetermined distance L in the front-rear direction. An input shaft of the final reduction gear 4 is arranged horizontally and directed forward, and an output shaft of the gearbox 3 is arranged to direct lower rear (diagonally downward and rearward). With this arrangement, a universal joint of the propeller shaft 5 has a predetermined intersection angle (also called as axis intersection angle, bending angle, etc.) θ.

To ensure as much mounting space as possible for the battery 6, the gearbox 3 is arranged as far back as possible and close to the final reduction gear 4. This shortens the distance L, and in this embodiment, the distance L is 500 mm or less. This increases the intersection angle θ of the universal joint, which tends to increase vibration and noise due to rotational fluctuation. Electric vehicles are vehicles that inherently have little vibration and noise, so if these increase, the product performance will be significantly reduced.

However, in this embodiment, a constant velocity joint 7 is used as the universal joint. As is well known, the constant velocity joint 7 can suppress rotational fluctuations within a tolerance up to a larger intersection angle θ compared to a general non-constant velocity joint, specifically a Cardan joint (or a Hook joint). Therefore, according to this embodiment, a drive system 1 suitable for an electric vehicle can be provided, which suppresses vibrations and noise caused by rotational fluctuations.

However, even though it is a constant velocity joint 7, there is an upper limit to the intersection angle θ. In this embodiment, the intersection angle θ is limited to a predetermined upper limit θmax or less, and the upper limit θmax is set to 10°. The intersection angle θ in this embodiment is set to a value greater than 0°, and equal to or less than the upper limit θmax. The upper limit θmax corresponds to the maximum value of the intersection angle θ at which rotational fluctuations can be suppressed within a tolerance.

If the intersection angle θ is made greater than the upper limit θmax, sliding of the slide parts of the ball or spherical part included in the constant velocity joint 7 increases, which may cause burning due to heat generation or reduce durability and lifespan. Also for this reason, the intersection angle θ is limited to the upper limit θmax or less.

The motor 2 is attached to a rear face of the gearbox 3 in a rearward inclined state, and is arranged to the side (right side) of the propeller shaft 5, parallel or approximately parallel to it. The motor 2, gearbox 3, and propeller shaft 5 are arranged in a U-shape in a plan view as shown in FIG. 2, and transmit driving force in a U-shape. This allows the overall front-rear length of the motor 2, gearbox 3, and propeller shaft 5 to be shortened, resulting in a compact configuration.

Figure 3:
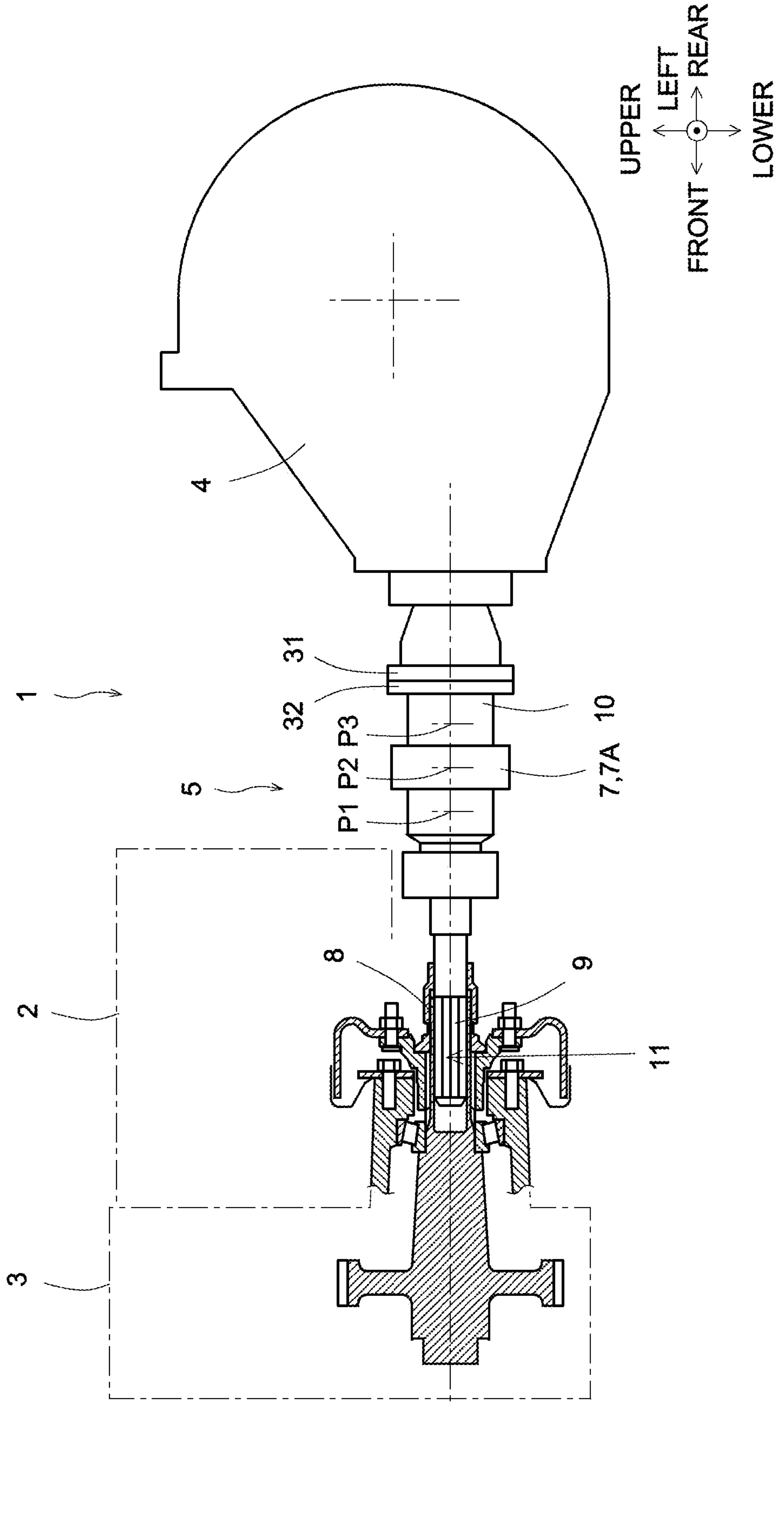
FIG. 3 is a side view showing the drive system.
Figure 4:
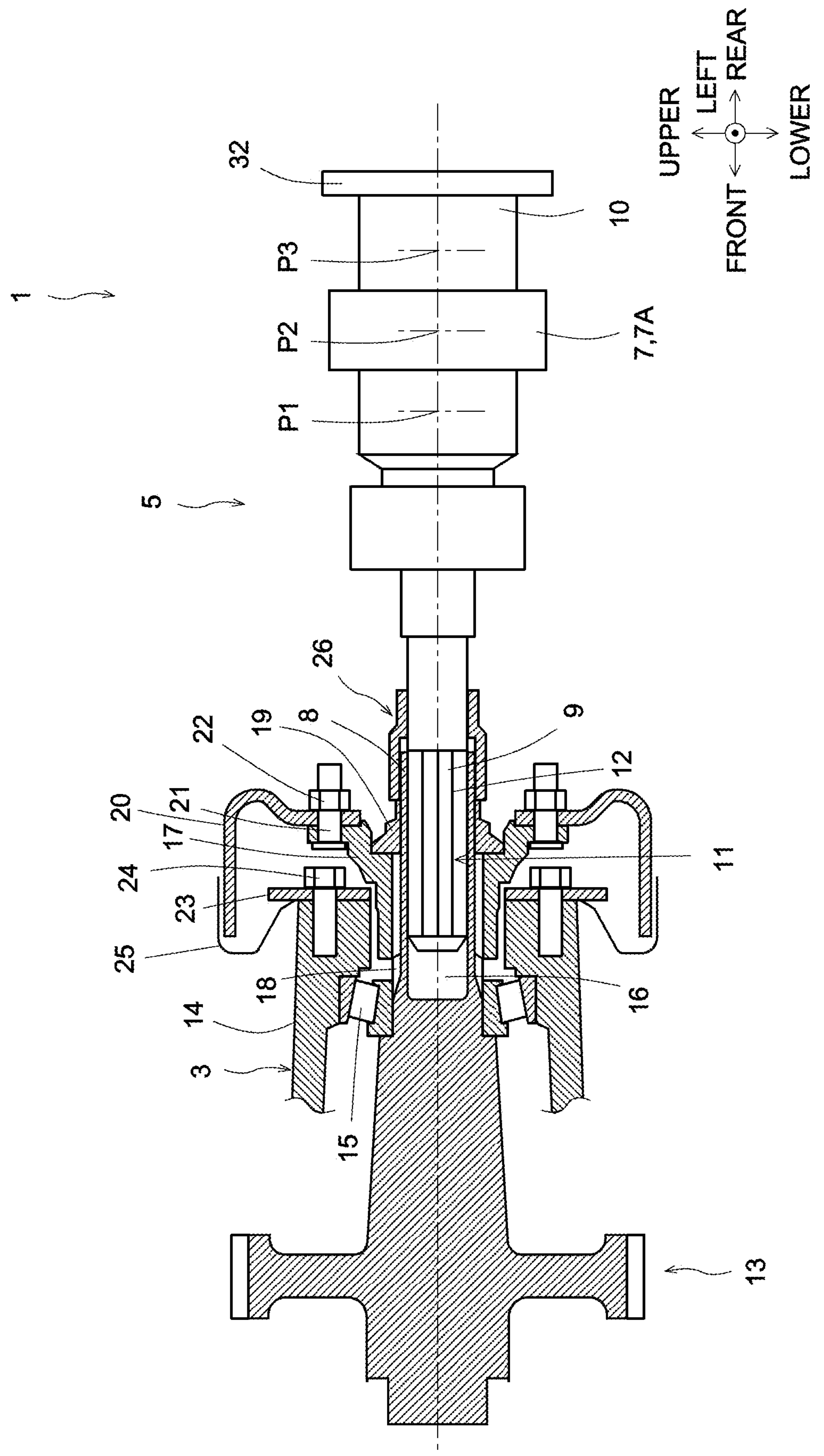
FIG. 4 is an enlarged side view showing the drive system.

FIGS. 3 and 4 show an enlarged view of the drive system 1 of this embodiment. For convenience, the intersection angle θ is eliminated (θ=0°) in the FIGS., and a configuration is shown in which the gearbox 3, propeller shaft 5, and final reduction gear 4 are all arranged coaxially.

The propeller shaft 5 comprises an input end part 9 that is coaxially connected to the output shaft 8 of the gearbox 3, an output end part 10 that is coaxially connected to an input shaft (not shown) of the final reduction gear 4, the constant velocity joint 7, and a slide part 11 that allows relative movement of the final reduction gear 4 with respect to the gearbox 3 in the front-rear direction.

In this embodiment, the input end part 9 is connected to the output shaft 8 of the gearbox 3 by a spline 12 so as to be axially slidable. The input end part 9 forms the slide part 11. The constant velocity joint 7 is a well-known double Cardan joint 7A.

More specifically, the gearbox 3 includes a gear mechanism 13 that reduces the rotation of the motor 2 input from the input shaft (not shown) and transmits it to the output shaft 8, and a casing 14 that houses the gear mechanism 13. The output shaft 8 is rotatably supported by the casing 14 via a bearing 15, and protrudes rearward from the casing 14. The output shaft 8 has a hollow section 16 with an open tip or rear end, and the hollow section 16 extends from the inside to the outside of the casing 14. The input end part 9 of the propeller shaft 5 is inserted into the hollow section 16, and the spline 16A (see FIG. 5) of the hollow section 16 and the spline 12 of the input end part 9 are meshed with each other so as to be axially slidable. The input end part 9 is inserted up to the hollow section 16 located inside the casing 14.

Meanwhile, a flange coupling 17 is meshed by spline 18 with the outer periphery of the output shaft 8 located radially outside the hollow section 16, and is secured by a nut 19. A drum 20 of the drum brake device is attached to the flange coupling 17 with fasteners, namely bolts 21 and nuts 22. On the inner periphery of the drum 20, a part 23 on the brake shoe side of the drum brake device is attached to the casing 14 with bolts 24. Reference numeral 25 denotes a drum cover that is co-fixed with the part 23.

The slide part 11 is lubricated with a lubricating oil such as grease. A seal device 26 is attached to the tip of the output shaft 8 to prevent the lubricating oil from leaking to the outside.

Figure 5:
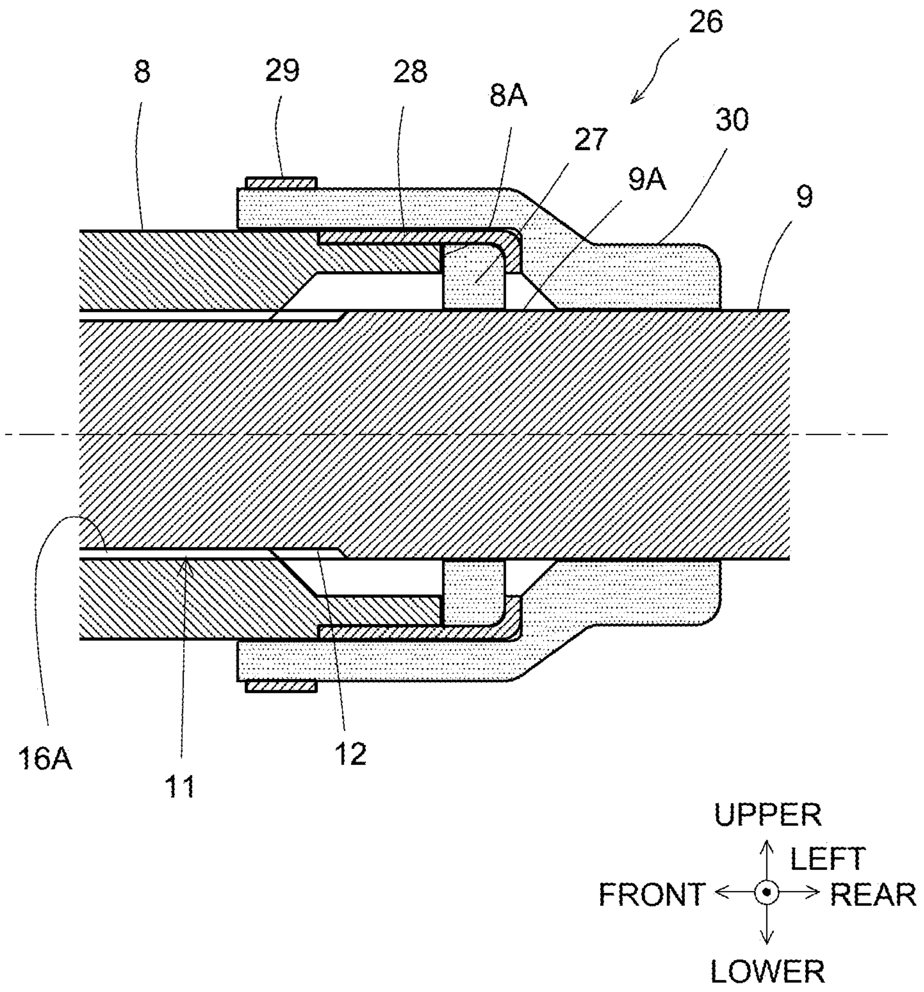
FIG. 5 is a longitudinal sectional side view showing a sealing device.

As shown in FIG. 5, the seal device 26 includes an annular rubber seal 27 that is fitted closely to a tip surface 8A of the output shaft 8 and the outer circumferential surface 9A of the input end part 9, a metal support member 28 formed in a generally cylindrical shape with a bottom that is integral with the rubber seal 27 and supports it from the outer circumferential side and tip side (rear side), and a rubber boot 30 that is fitted closely to the outer circumferences of the output shaft 8, the support member 28 and the input end part 9 to support them, and is fixed to the output shaft 8 with a fixing device (a band 29 in this embodiment). The rubber boot 30 prevents external dust and the like from entering toward the rubber seal 27.

As shown in FIGS. 3 and 4, a flange 31 is attached integrally to the input shaft of the final reduction gear 4. Meanwhile, a flange 32 is also integrally provided to the output end part 10 of the propeller shaft 5. These flanges 31, 32 are fixed together with bolts and nuts (not shown), so that the output end part 10 of the propeller shaft 5 is coaxially connected to the input shaft of the final reduction gear 4.

As is well known, the double Cardan joint 7A serving as the constant velocity joint 7 is made by connecting two Cardan joints with a ball joint, and has three pivot or bending points P1, P2, and P3 in the front-rear direction. An input end part of the double Cardan joint 7A is substantially the same as the input end part 9 of the propeller shaft 5, and an output end part of the double Cardan joint 7A is substantially the same as the output end part 10 of the propeller shaft 5.

Figure 6:
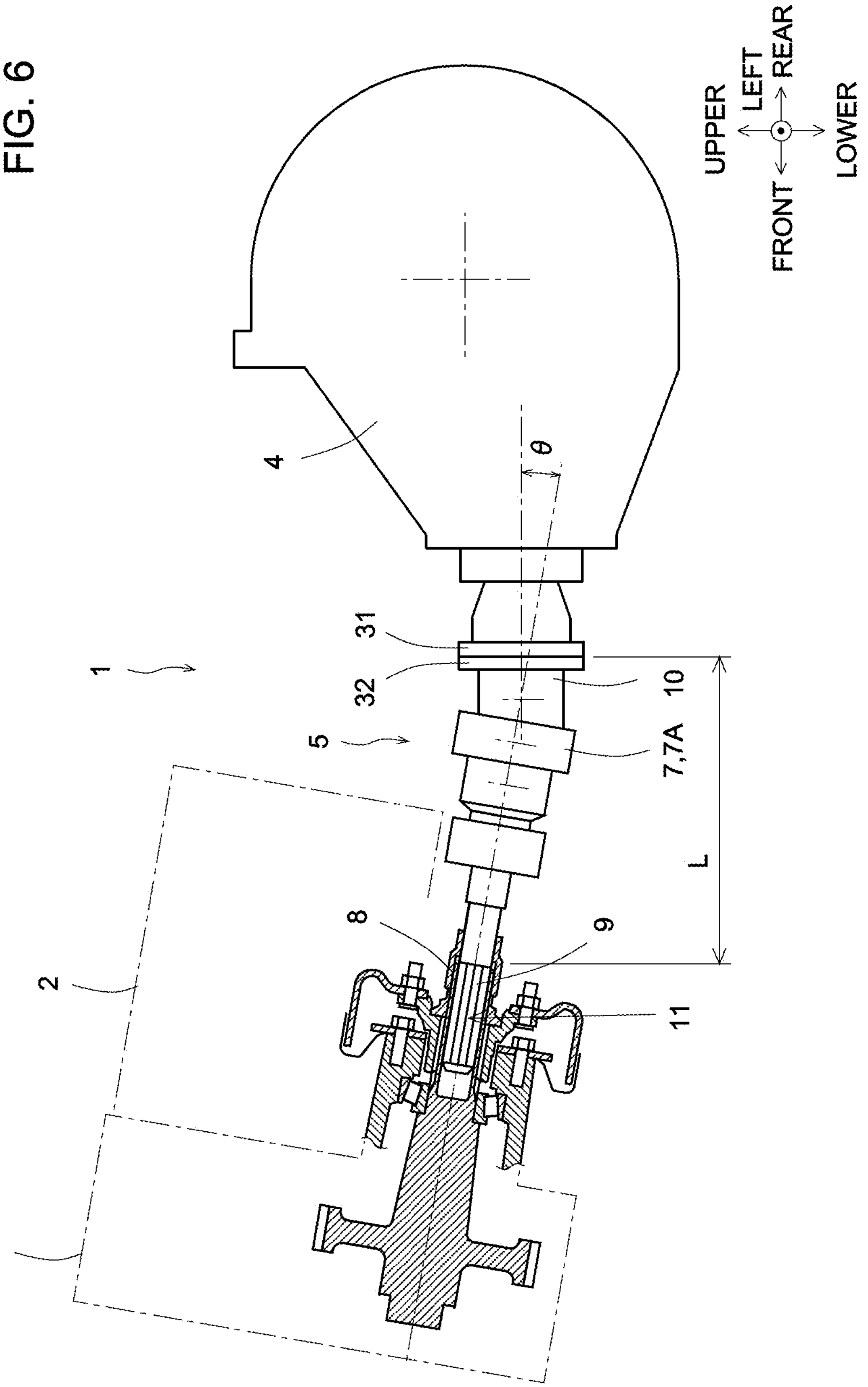
FIG. 6 is a side view showing the drive system mounted on a vehicle.

FIG. 6 shows the drive system 1 mounted on the vehicle. At this time, the double Cardan joint 7A is bent at a predetermined intersection angle θ. For convenience, the double Cardan joint 7A is drawn as if it is bent only at the rearmost bending point P3 in the figure, but in reality, three bending points P1, P2, and P3 are bent almost evenly to form an overall intersection angle θ (the same applies to the figures described below). The input shaft of the final reduction gear 4 is directed horizontally and forward, and the output shaft 8 of the gearbox 3 is directed to lower rear (diagonally downward and rearward).

Since the intersection angle θ is equal to or less than the upper limit θmax (10° in this embodiment), the rotational fluctuation caused by the bending of the double Cardan joint 7A can be suppressed within an allowable value. The vibration and noise caused by this rotational fluctuation can be suppressed, and a drive system 1 suitable for electric vehicles can be provided.

Incidentally, in typical engine vehicles, inherent vibration and noise are greater than those of electric vehicles, so the Cardan joint, which is a non-constant velocity joint, can be used at an intersection angle greater than zero. However, this is not possible in electric vehicles such as the present embodiment. This is because the rotational fluctuation exceeds the allowable value, and the vibration and noise become unacceptably large. Therefore, in this embodiment, Cardan joint cannot be used instead of the constant velocity joint 7. If Cardan joint can be used, it is only when the intersection angle of the Cardan joint is equal to zero, which does not cause rotational fluctuation.

On the other hand, when the vehicle V is traveling, the final reduction gear 4 moves up and down due to unevenness in the road surface, and as a result, the final reduction gear 4 relatively moves in the front-rear direction with respect to the gearbox 3. In this embodiment, the input end part 9 of the propeller shaft 5 slides axially with respect to the output shaft 8 of the gearbox 3, thereby absorbing such relative movement in the front-rear direction. Thus, in this embodiment, by providing the slide part 11, the relative movement of the final reduction gear 4 with respect to the gearbox 3 can be absorbed, and the final reduction gear 4 can move up and down smoothly. In addition, the input end part 9 of the propeller shaft 5 is inserted into the output shaft 8 of the gearbox 3 to form the slide part 11, which substantially shortens the length of the propeller shaft 5 and advantageously shortens the distance L between the gearbox 3 and the final reduction gear 4.

In particular, in this embodiment, the output shaft 8 of the gearbox 3 is provided with the hollow section 16 that spans the inside and outside of the casing 14, and the input end part 9 of the propeller shaft 5 is inserted into this hollow section 16 and the both are spline-fitted. Therefore, the input end part 9 can be spline-fitted to the output shaft 8 even inside the casing 14, which is also advantageous for shortening the distance L between the gearbox 3 and the final reduction gear 4.

Note that the distance L between the gearbox 3 and the final reduction gear 4 refers to a front-rear distance between the rearmost end of the output shaft 8 which is the rearmost end of the gearbox 3, and a front end face of the flange 31 which is the frontmost end of the final reduction gear 4, when the gearbox 3 and the final reduction gear 4 are mounted on the vehicle as shown in FIG. 6.

Next, modified examples will be described.

Figure 7:
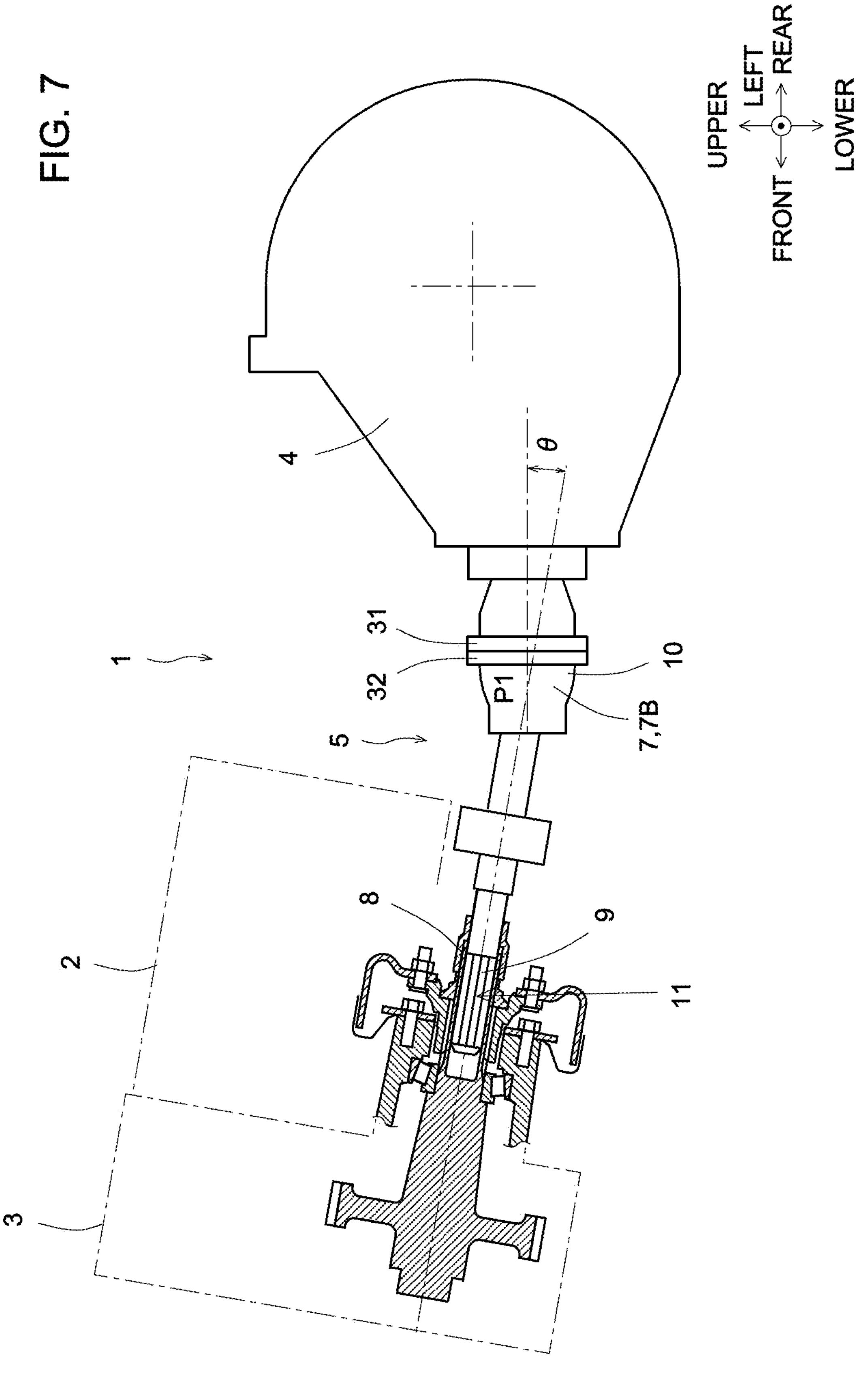
FIG. 7 is a side view showing a modified example of the first embodiment.

As shown in FIG. 7, in this modified example, the constant velocity joint 7 is formed by a Rzeppa joint 7B. As is well known, the Rzeppa joint 7B has input and output end parts connected by a number of balls arranged in the circumferential direction, and has one bending point P1 in the front-rear direction. An input end part of the Rzeppa joint 7B is substantially the same as the input end part 9 of the propeller shaft 5, and an output end part of the Rzeppa joint 7B is substantially the same as the output end part 10 of the propeller shaft 5.

Even if the constant velocity joint 7 is replaced with the Rzeppa joint 7B in this way, the same effect as described above can be obtained.

Second Embodiment

Next, a second embodiment of the present disclosure will be described. Note that the same parts as those in the first embodiment are given the same reference numerals in the drawings and will not be described again. Below, the differences from the first embodiment will be mainly described.

Figure 8:
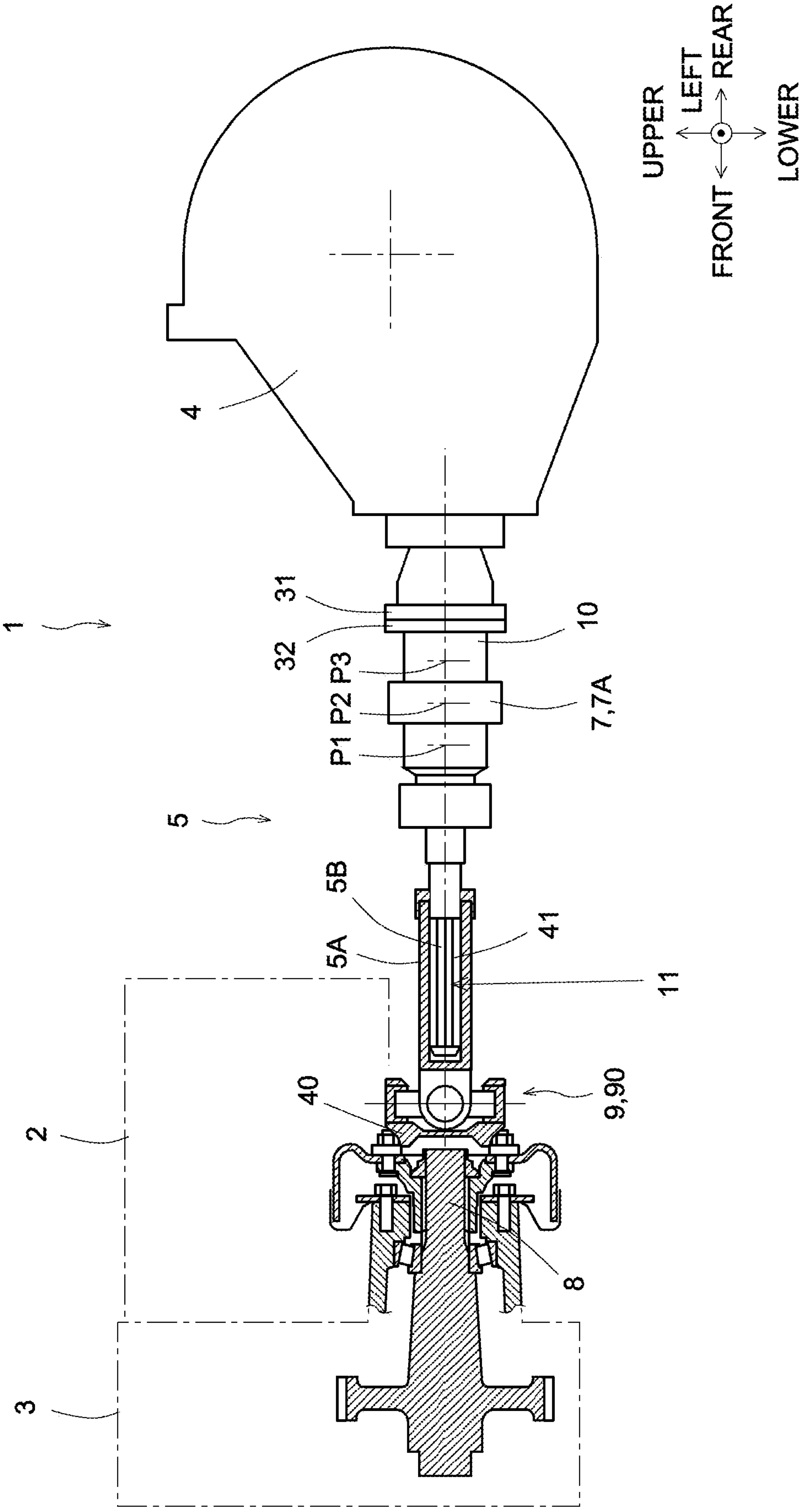
FIG. 8 is a side view showing the drive system according to a second embodiment.
Figure 9:
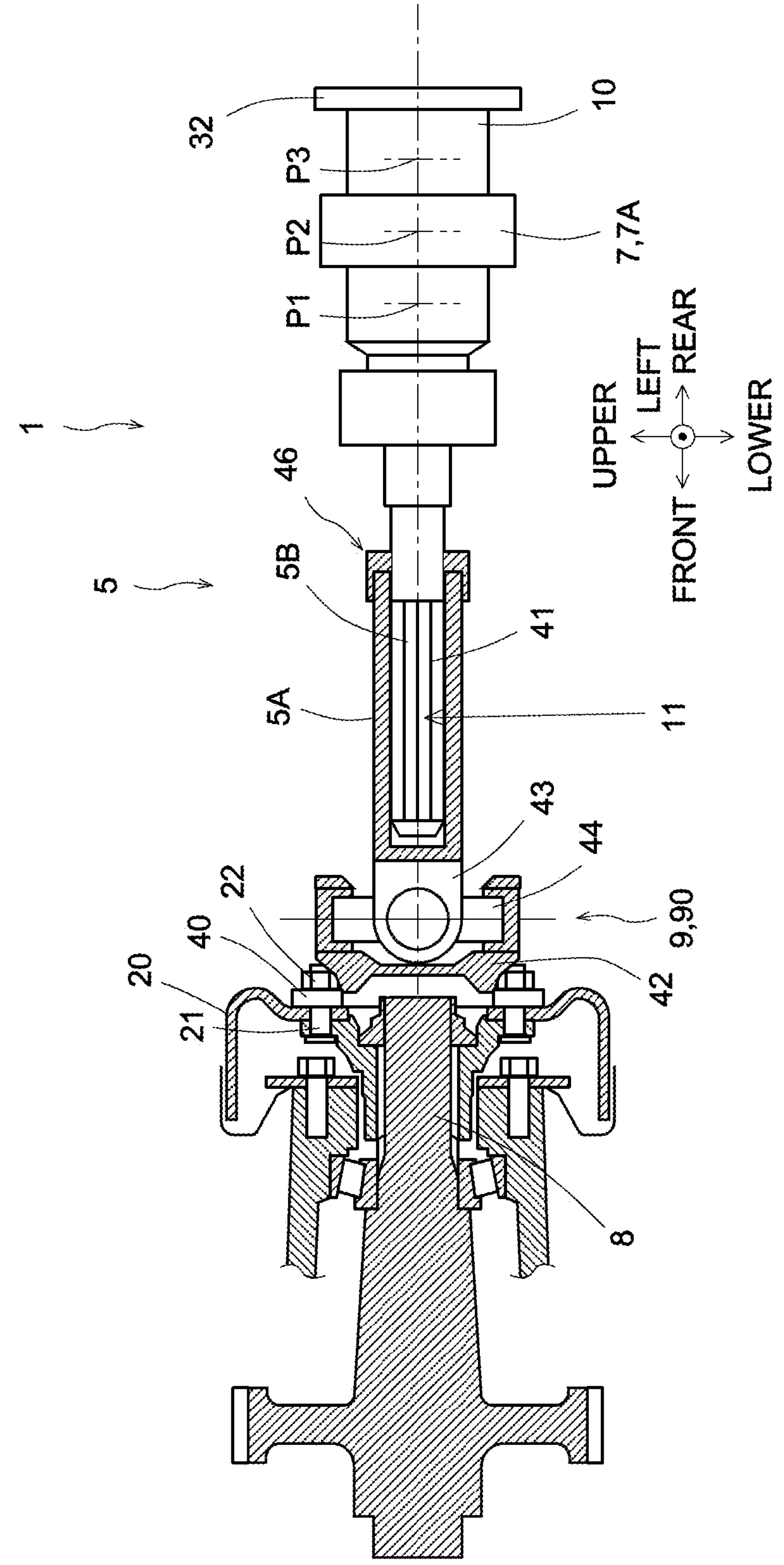
FIG. 9 is an enlarged side view showing the drive system of the second embodiment.

The drive system 1 of this embodiment is shown in FIGS. 8 and 9. For convenience, the intersection angle θ is set to 0° in these figures as well.

In this embodiment, the input end part 9 of the propeller shaft 5 is coaxially fixed to the output shaft 8 of the gearbox 2 by a flange 40. In this embodiment, the input end part 9 is formed by a Cardan joint 90 which is a non-constant velocity joint. Therefore, two universal joints (the Cardan joint 90 and the double Cardan joint 7A) are provided in series on the propeller shaft 5.

The propeller shaft 5 also has an input side split shaft part 5A and an output side split shaft part 5B, which are formed by splitting the middle part of the propeller shaft 5. The input side split shaft part 5A and the output side split shaft part 5B are connected to each other by a spline 41 so as to be axially slidable, forming a slide part 11.

In more detail, the output shaft 8 of the gearbox 3 is made shorter than that in the first embodiment, the hollow section 16 is omitted, and the protruding length from the casing 14 is also shortened. A flange 40 is provided integrally with the input end part 42 of the Cardan joint 90. This flange 40 is placed on a front face of the drum 20 and is co-fastened with the drum 20 by bolts 21 and nuts 22.

As is well known, the Cardan joint 90 has a cross shaft 44 connecting its input end part 42 and output end part 43. The output end part 43 is substantially the same as the input side split shaft part 5A and is formed integrally with the front end of the input side split shaft part 5A. The input side split shaft part 5A is formed in a cylindrical shape with a closed front end and an open rear end.

The output side split shaft part 5B is substantially the same as the input end part of the double Cardan joint 7A. The output side split shaft part 5B is inserted into the input side split shaft part 5A. A spline 41 of the output side split shaft part 5B is engaged with a spline 45 (see FIG. 10) of the input side split shaft part 5A so as to be axially slidable.

The slide part 11 thus formed is lubricated with a lubricant such as grease. To prevent this lubricant from leaking to the outside, a seal device 46 is attached to the tip of the input side split shaft part 5A.

Figure 10:
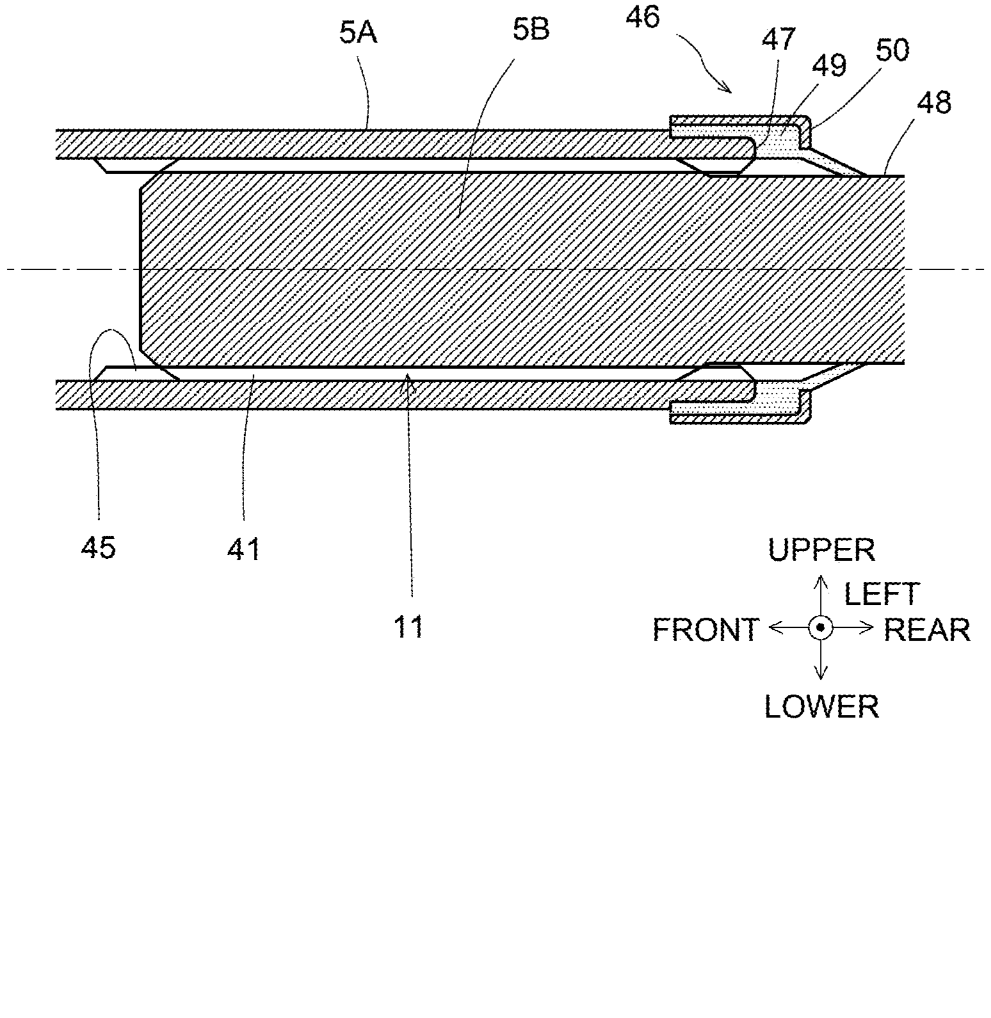
FIG. 10 is a longitudinal sectional side view showing a sealing device.

As shown in FIG. 10, the seal device 46 includes an annular rubber seal 49 that is in close contact with a stepped tip surface 47 of the input side split shaft part 5A and an outer circumferential surface 48 of the output side split shaft part 5B, and a substantially bottomed cylindrical metal support member 50 that is integral with the rubber seal 49 and supports it from an outer circumferential side and a tip side (rear side). A rubber boot similar to the above may be additionally provided.

Figure 11:
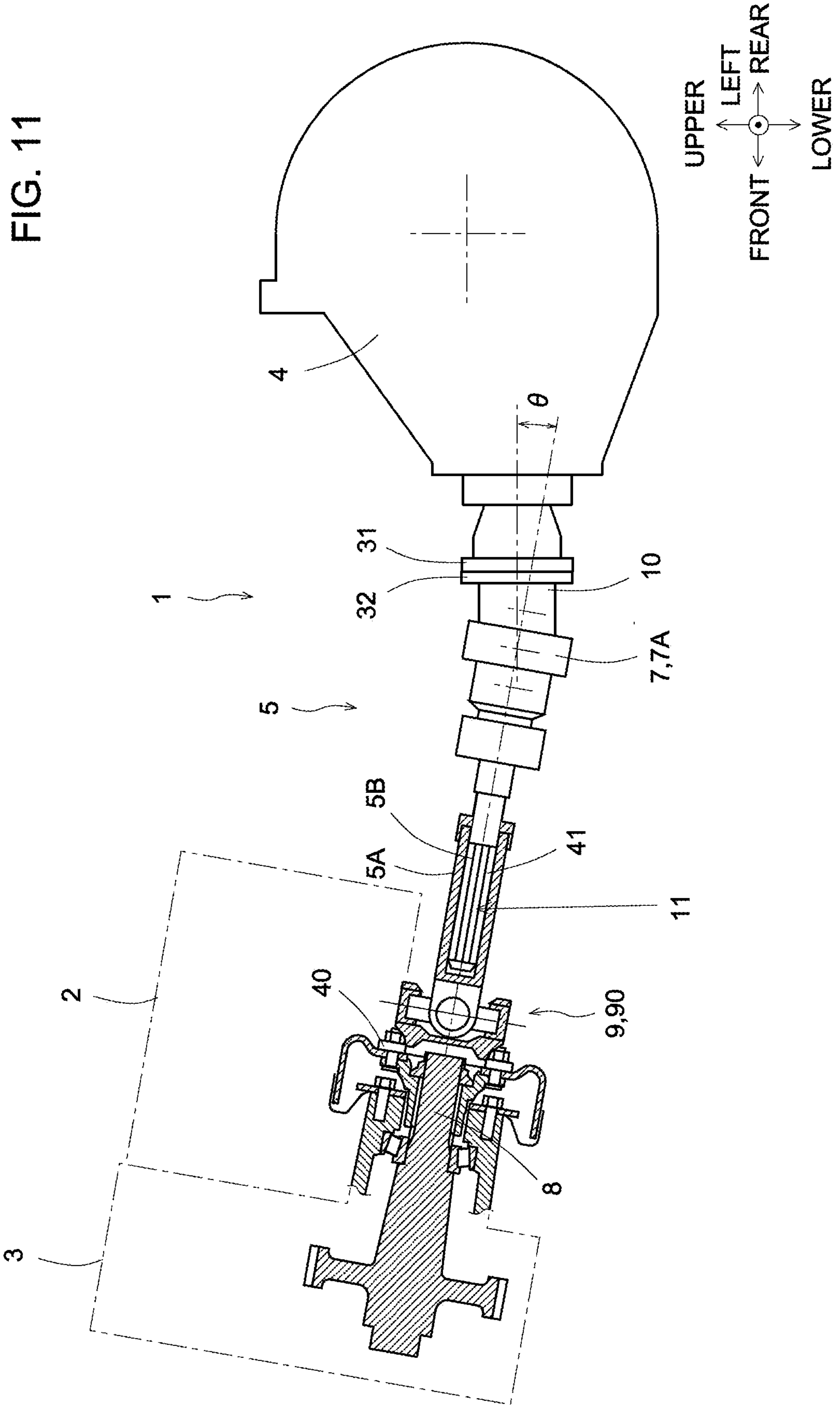
FIG. 11 is a side view showing the drive system mounted on a vehicle.

FIG. 11 shows the drive system 1 of this embodiment mounted on the vehicle. At this time, the double Cardan joint 7A is bent at the same intersection angle θ as above. On the other hand, the Cardan joint 90 is not bent and its intersection angle is zero. Therefore, the Cardan joint 90 can be used.

According to this embodiment, both the double Cardan joint 7A and the Cardan joint 90 can be set to the intersection angles that can suppress rotational fluctuations within an allowable value, and a drive system 1 that is suitable for electric vehicles and suppresses vibration and noise can be provided.

Furthermore, in this embodiment, the slide part 11 in the middle part in the axial direction absorbs the relative movement of the final reduction gear 4 with respect to the gearbox 3, allowing the final reduction gear 4 to smoothly move up and down.

Next, modified examples will be described.

(First Modified Example)

Figure 12:
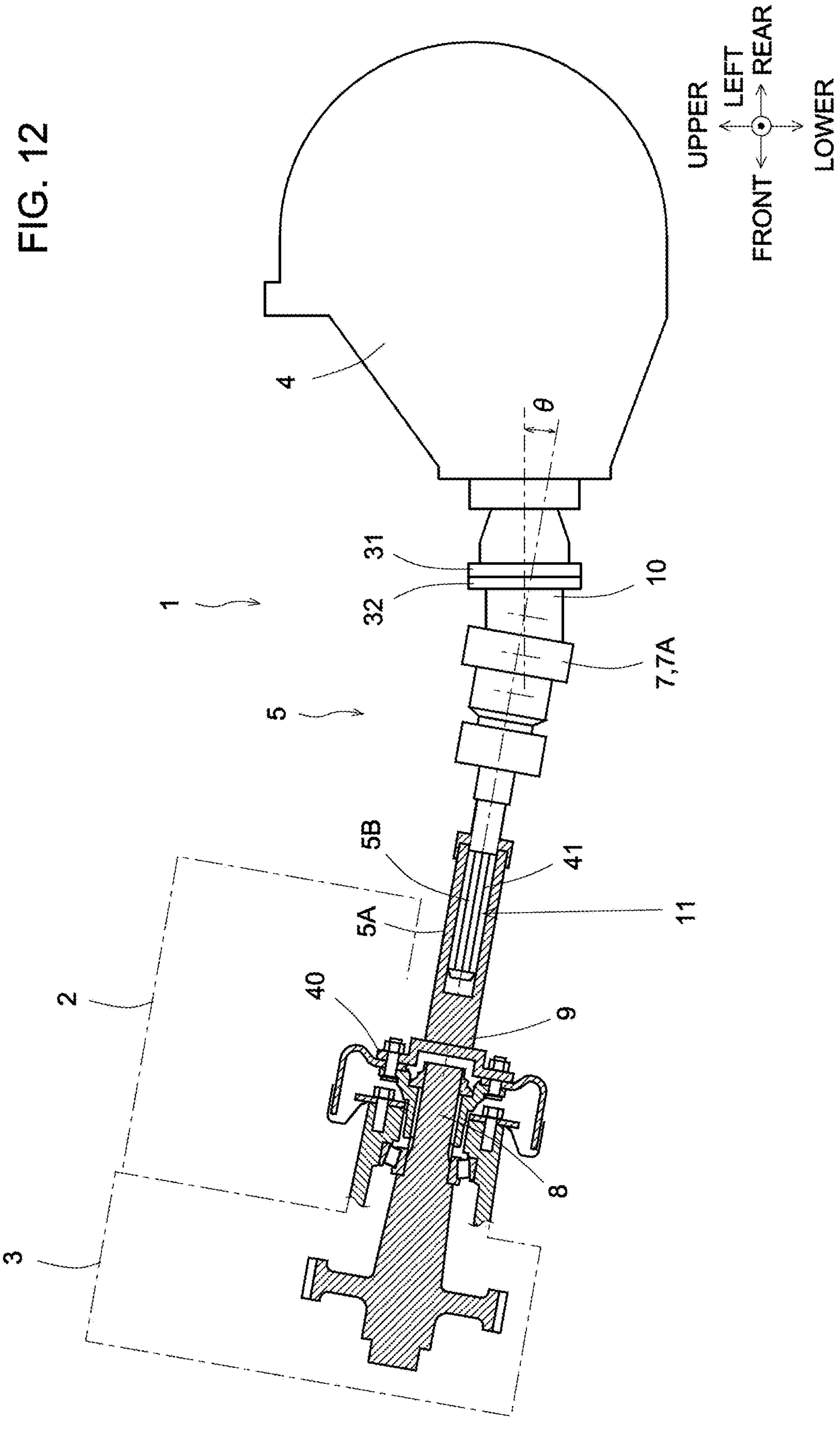
FIG. 12 is a side view showing a first modified example of the second embodiment.

FIG. 12 shows the drive system 1 of a first modified example in a vehicle-mounted state. This first modified example is similar to the above basic embodiment in that the input end part 9 of the propeller shaft 5 is fixed to the output shaft 8 of the gearbox 2 by the flange 40. However, in this modified example, the Cardan joint 90 is omitted, and the front end of the input side split shaft part 5A forms the input end part 9 of the propeller shaft 5, to which the flange 40 is directly attached.

This modified example also can achieve the same effect as described above. In addition, the Cardan joint 90 can be omitted, which reduces costs.

(Second Modification)

Figure 13:
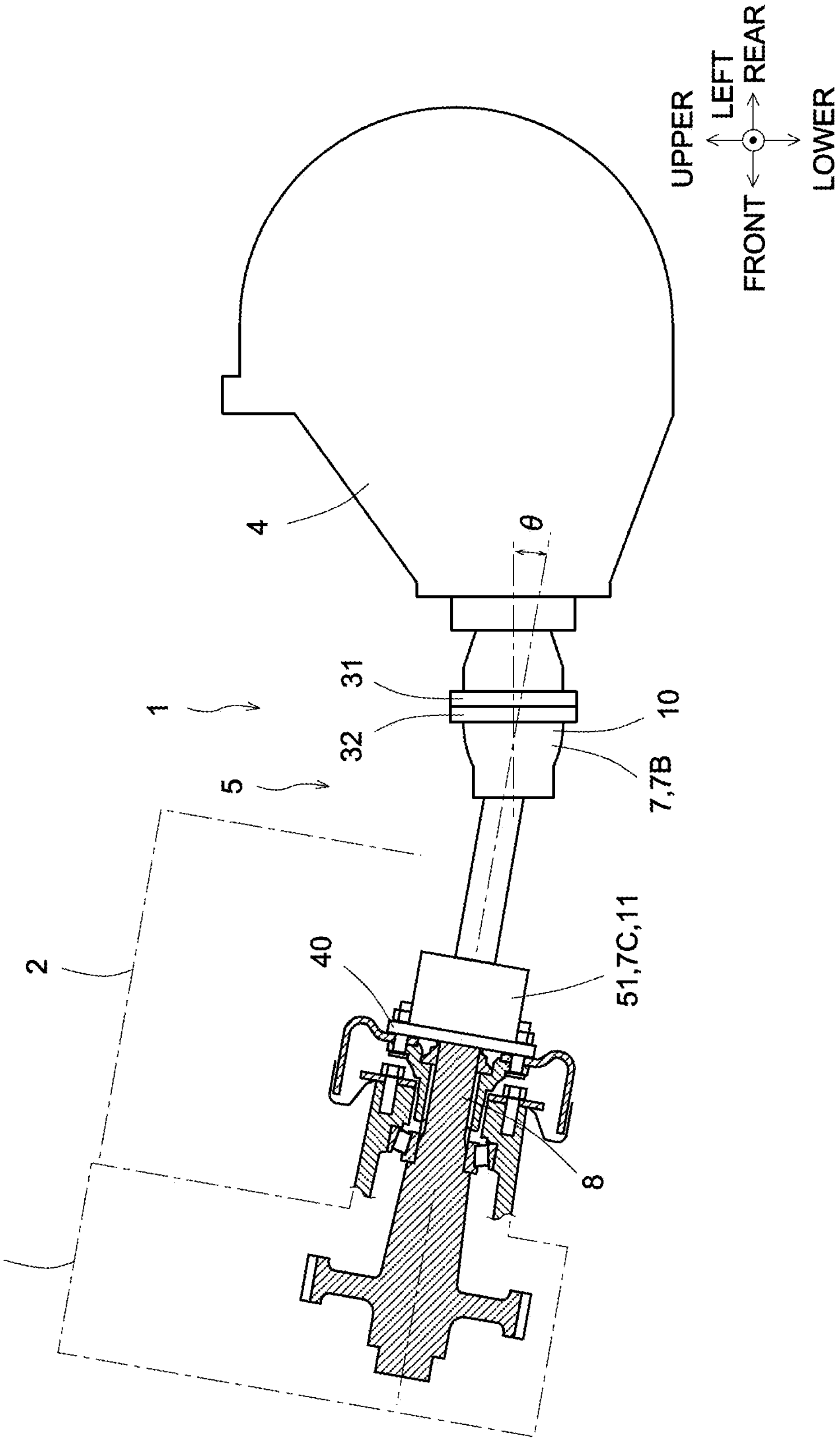
FIG. 13 is a side view showing a second modified example of the second embodiment.

FIG. 13 shows the drive system 1 of a second modification in a vehicle-mounted state. In this second modification, a Rzeppa joint 7B is provided instead of the rear double Cardan joint 7A in the above basic embodiment (FIG. 11).

The input side split shaft part 5A and the output side split shaft part 5B as described are omitted, that is, the slide part 11 in the middle part in the axial direction is omitted.

In addition, instead of the front Cardan joint 90 in the above basic embodiment (FIG. 11), another constant velocity joint 51 that can expand and contract in the axial direction, specifically a double offset joint (DOJ) 7C, is provided. The double offset joint 7C forms the slide part 11. The flange 40 is integrally provided at the input end part of the double offset joint 7C, and this flange 40 is coaxially connected to the output shaft 8 of the gearbox 3.

As is well known, the double offset joint 7C has a structure similar to that of the Rzeppa joint 7B, which is made expandable and contractible in the axial direction, and inside the joint, balls can move along ball grooves parallel to the axial direction. Therefore, the double offset joint 7C forms a slide part 11.

In this modified example, the rear Rzeppa joint 7B is bent at a predetermined intersection angle θ, as described above. On the other hand, the front double offset joint 7C is not bent, its intersection angle is zero, and it is solely responsible for sliding in the axial direction.

However, since the double offset joint 7C is a type of constant velocity joint, it can also be used at an intersection angle greater than zero and equal to or less than the upper limit value θmax. In this way, the intersection angle θ of the rear Rzeppa joint 7B can be reduced. Therefore, it may be advantageous in suppressing rotational fluctuation. In this case, the sum of the intersection angles of the double offset joint 7C and the Rzeppa joint 7B is greater than zero and equal to or less than the upper limit θmax.

(Third Modification)

Figure 14:
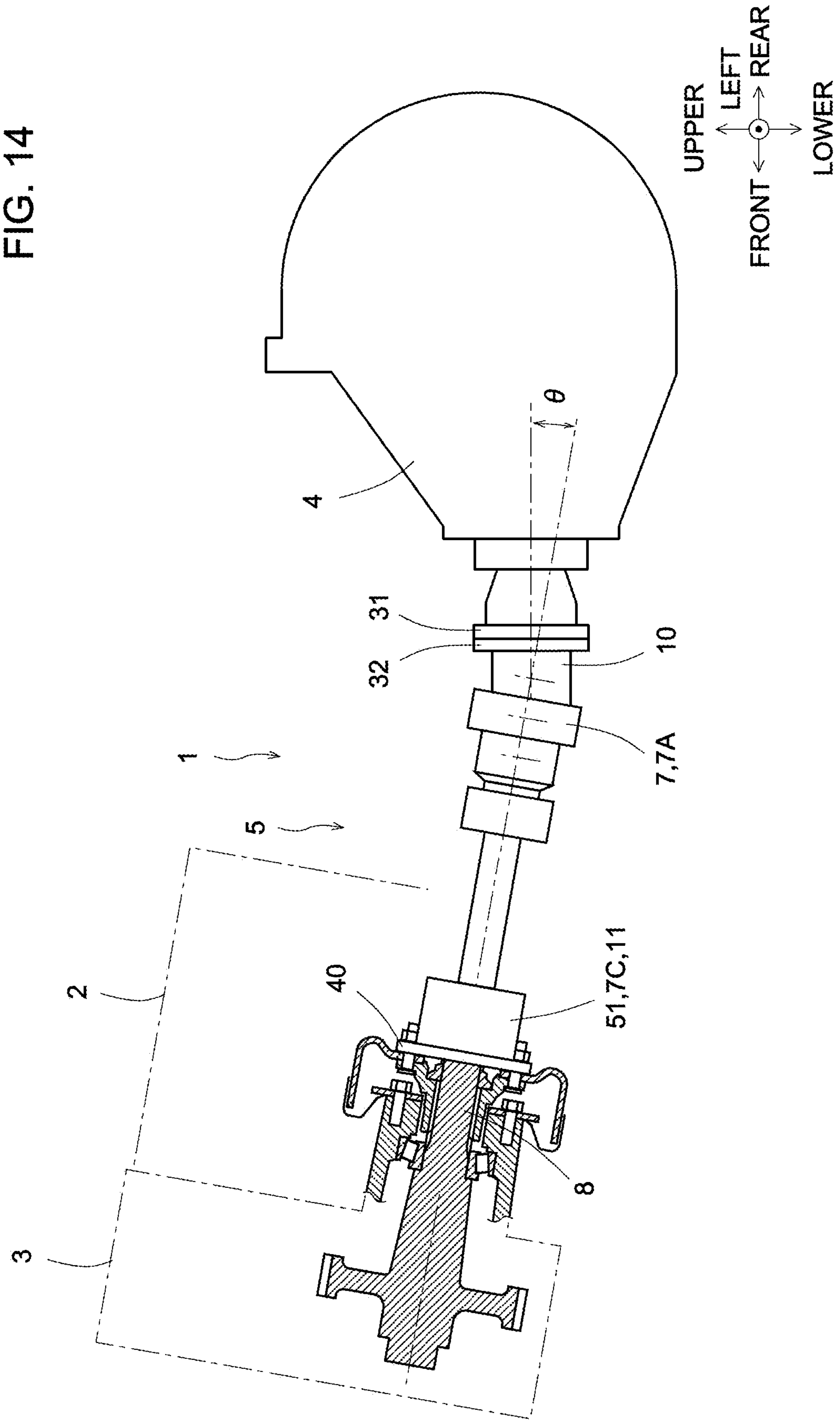
FIG. 14 is a side view showing a third modified example of the second embodiment.

In the third modification shown in FIG. 14, a double Cardan joint 7A is provided instead of the rear Rzeppa joint 7B in the second modification (FIG. 13).

(Fourth Modification)

Figure 15:
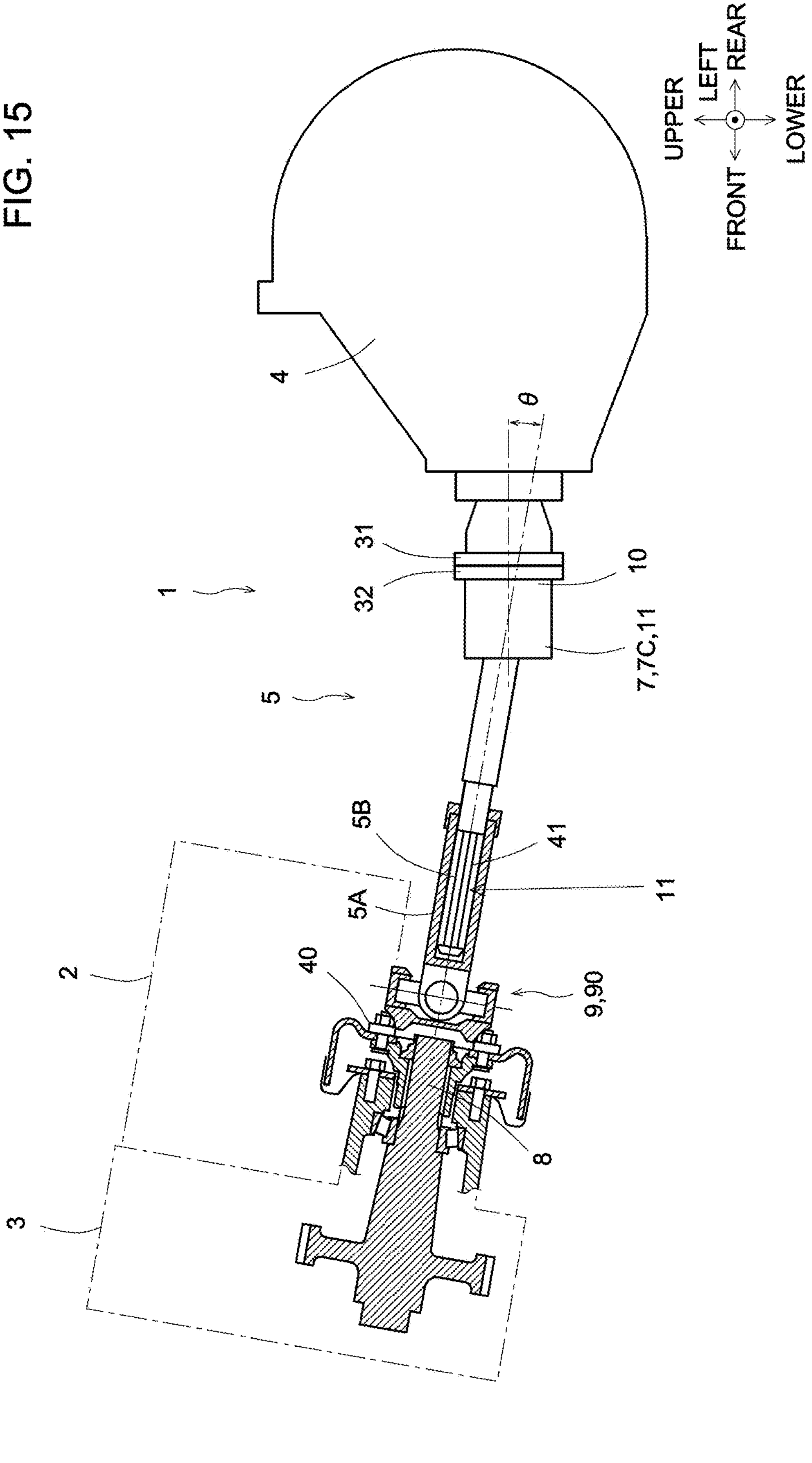
FIG. 15 is a side view showing a fourth modified example of the second embodiment.

In the fourth modification shown in FIG. 15, a double offset joint 7C is provided instead of the rear double Cardan joint 7A in the basic embodiment (FIG. 11). The double offset joint 7C is bent at the same intersection angle θ as above. This double offset joint 7C also forms the slide part 11, so in this embodiment, two slide parts 11 are provided in the front-rear direction.

In this modified example, alternatively, the slide part 11 in the middle part in the axial direction formed by the input side split shaft part 5A and the output side split shaft part 5B may be omitted.

Although embodiments of the present disclosure have been described in detail above, various other embodiments and modified examples of the present disclosure are conceivable.

(1) For example, a constant velocity joint other than the above can be used as the constant velocity joint 7. For example, a fixed tripod joint, a sliding tripod joint, or a cross groove joint can be used. Incidentally, the constant velocity joint 7 includes another constant velocity joint 51 that can expand and contract in the axial direction.

(2) Similarly, as the other constant velocity joint 51 that can expand and contract in the axial direction, in addition to the double offset joint 7C, for example, a cross groove joint can be used.

(3) In the reverse order from the basic embodiment of the first embodiment (FIG. 6), the output end part 10 of the propeller shaft 5 may be connected to the input shaft of the final reduction gear 4 by a spline so as to be axially slidable, thereby forming a slide part.

(4) In the basic embodiment of the first embodiment (FIG. 6), the input end part 9 of the propeller shaft 5 may be formed hollow, and the output shaft 8 of the gearbox 3 may be inserted therein.

Figure 16:
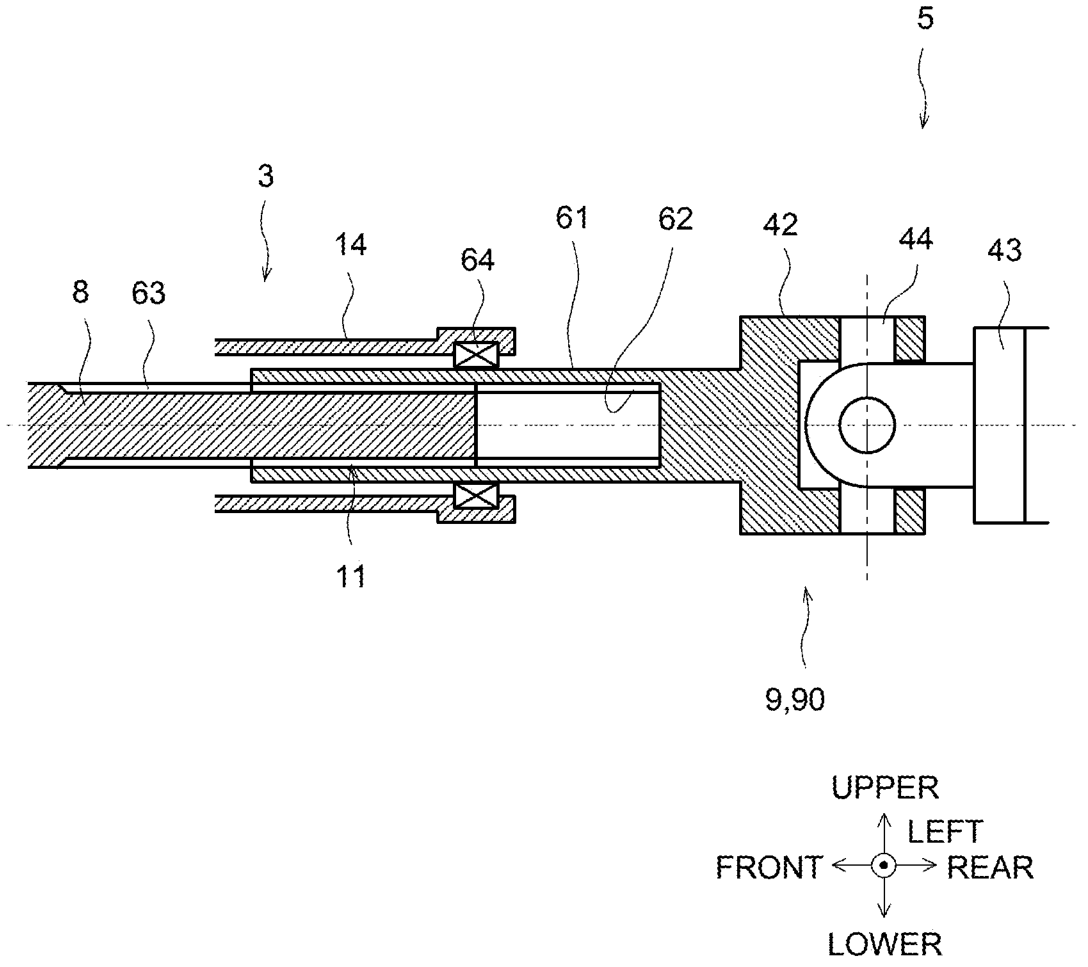
FIG. 16 is a side view showing a modified example of the first embodiment.

FIG. 16 shows a modification of this case. In this modification, the input end part 9 of the propeller shaft 5 is formed by a Cardan joint 90 which is a non-constant velocity joint. Therefore, two universal joints (the Cardan joint 90 and the double Cardan joint 7A (see FIG. 6)) are provided in series on the propeller shaft 5. The intersection angle of the Cardan joint 90 is set to zero.

The Cardan joint 90 has a cross shaft 44 that connects its input end part 42 and output end part 43. The output end part 43 substantially forms an input end part of the double Cardan joint 7A.

A hollow shaft 61 extending forward is integrally provided at the input end part 42 of the Cardan joint 90. A spline 62 is provided on the inner circumference of the hollow shaft 61.

On the other hand, the output shaft 8 of the gearbox 3 is a solid shaft extending rearward. A spline 63 is provided on the outer circumference of the output shaft 8. The inner circumference of the hollow shaft 61 is fitted onto the outer circumference of the output shaft 8, and the spline 62 of the hollow shaft 61 is meshed with the spline 63 of the output shaft 8 so as to be axially slidable. This forms the slide part 11. The hollow shaft 61 is inserted into the casing 14 of the gearbox 3, and is fitted to the output shaft 8 within the casing 14.

A seal device 64 is attached to the casing 14 of the gearbox 3. The seal device 64 slides against the outer circumferential surface of the hollow shaft 61 to seal the gap between the casing 14 and the hollow shaft 61.

The embodiments of the present disclosure are not limited to the above-mentioned embodiments, and all modifications, applications, and equivalents encompassed within the concept of the present disclosure as defined by the claims are included in the present disclosure. Therefore, the present disclosure should not be interpreted in a restrictive manner, and may be applied to any other technology that falls within the scope of the concept of the present disclosure.

What is claimed is:

1. A drive system for an electric vehicle, comprising:

a gearbox that outputs a driving force from a motor;

a final reduction gear for transmitting the input driving force to left and right wheels; and a propeller shaft extending in a front-rear direction and connecting the gearbox and the final reduction gear, wherein the propeller shaft comprises:

an input end part that is coaxially connected to an output shaft of the gearbox;

an output end part that is coaxially connected to an input shaft of the final reduction gear;

a constant velocity joint that is disposed at an intersection angle greater than zero and equal to or less than a predetermined upper limit; and a slide part that allows relative movement of the final reduction gear with respect to the gearbox in the front-rear direction, wherein the input end part is connected to the output shaft of the gearbox by a spline so as to be axially slidable, and the input end part forms the slide part.

2. The drive system according to claim 1, wherein the upper limit is 10°.

3. The drive system according to claim 1, wherein a distance between the gearbox and the final reduction gear in the front-rear direction is 500 mm or less.

4. The drive system according to claim 1, wherein the gearbox is disposed in a rearward inclined state.

5. The drive system according to claim 1, wherein the constant velocity joint is a double Cardan joint or a Rzeppa joint.

* * * * *